United States Patent
Prchlik et al.

(10) Patent No.: US 12,517,040 B2
(45) Date of Patent: Jan. 6, 2026

(54) SPECTRAL ANALYSIS WITH LINEAR IMAGE SENSOR

(71) Applicant: Baker Hughes Holdings LLC, Houston, TX (US)

(72) Inventors: Jakub Joseph Prchlik, Solon, OH (US); Arlo Dante Petitjean, Twinsburg, OH (US); James Ryan Tunningley, Strongsville, OH (US); Robert Badea, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 349 days.

(21) Appl. No.: 18/296,145

(22) Filed: Apr. 5, 2023

(65) Prior Publication Data

US 2024/0337593 A1  Oct. 10, 2024

(51) Int. Cl.
*G01N 21/31* (2006.01)
*G01M 15/14* (2006.01)

(52) U.S. Cl.
CPC .......... *G01N 21/31* (2013.01); *G01M 15/14* (2013.01); *G01N 2201/0634* (2013.01)

(58) Field of Classification Search
CPC .......... G01N 21/31; G01N 2201/0634; G01M 15/14; G06T 2207/10024; G06T 5/70; G06T 2207/10016; G06T 2207/30196; G06T 5/50; G06T 1/20; G06T 7/20; G06T 5/20; G06T 7/0012; G06T 7/246; G06T 7/70; G06T 3/4015; G06T 5/00; G06T 7/0016; G06T 2207/20221;
(Continued)

(56) References Cited

U.S. PATENT DOCUMENTS

| 7,281,382 B2 | 10/2007 | Plimpton et al. |
| 10,159,451 B2 | 12/2018 | Allinson et al. |

(Continued)

FOREIGN PATENT DOCUMENTS

| CN | 204214770 U | 3/2015 | |
| WO | WO-02070953 A1 | 9/2002 | |
| WO | WO-2021229575 A1 * | 11/2021 | ............... G01J 9/00 |

OTHER PUBLICATIONS

Xinyuan Qian, et al., "An Adaptive Integration Time CMOS Image Sensor With Multiple Readout Channels," IEEE (Dec. 23, 2013).
(Continued)

*Primary Examiner* — Tarifur R Chowdhury
*Assistant Examiner* — Akbar H. Rizvi
(74) *Attorney, Agent, or Firm* — Mintz, Levin, Cohn, Ferris, Glovsky and Popeo, P.C. US

(57) ABSTRACT

A first set of data characterizing a spectrum of light emitted or reflected by an object is received from a linear light sensor. Each pixel of the linear light sensor corresponds to a specified range of light frequencies. The data includes a first intensity of each pixel at a first sample rate. A subset of pixels is classified as points of interest within the first set of data. A second sample rate of each pixel is determined for each of the subset of pixels. A second set of data characterizing the spectrum of the light is retrieved. The second set of data includes a second intensity of each of the subset of pixels at the second sample rate. The first set of data and the second set of data are combined to produce a third set of data characterizing the spectrum.

21 Claims, 6 Drawing Sheets

(58) Field of Classification Search
CPC . G06T 2207/30024; G06T 7/215; G06T 7/55;
G06T 5/94; G06T 7/248; G06T 7/90;
G06T 2207/10021; G06T 2207/10048;
G06T 2207/10152; G06T 2207/20081;
G06T 2207/20084; G06T 2207/30004;
G06T 2207/30261; G06T 7/0002; G06T
7/521; G06T 2207/10056; G06T
2207/10064; G06T 2207/20012; G06T
2207/20028; G06T 2207/20056; G06T
2207/20104; G06T 2207/20208; G06T
2207/30048; G06T 2207/30168; G06T
3/4053; G06T 5/73; G06T 7/254; G06T
7/586; G06T 2207/10028; G06T
2207/30028; G06T 2207/30201; G06T
7/251; G06T 7/593; G06T 2200/28; G06T
2207/20021; G06T 2207/30016; G06T
2207/30076; G06T 2207/30148; G06T
2207/30204; G06T 2207/30228; G06T
5/77; G06T 5/80; G06T 5/92; G06T
7/0006; G06T 7/001; G06T 7/13; G06T
7/136; G06T 7/292; G06T 7/30; G06T
7/33; G06T 7/344; G06T 2200/16; G06T
2200/24; G06T 2207/10012; G06T
2207/10061; G06T 2207/10081; G06T
2207/10088; G06T 2207/10104; G06T
2207/10108; G06T 2207/10121; G06T
2207/20064; G06T 2207/20076; G06T
2207/20132; G06T 2207/20182; G06T
2207/20216; G06T 2207/30088; G06T
2207/30096; G06T 2207/30221; G06T
2207/30232; G06T 2207/30241; G06T
3/4038; G06T 5/60; G06T 7/0004; G06T
7/269; G06T 7/32; G06T 7/596; G06T
1/00; G06T 7/00; G06T 9/00; G06T
11/00; G06T 2200/00; G06T 2201/00;
G06T 2207/00; G06T 2210/00; G06T
2211/00; G06T 2213/00; G06T 2215/00
See application file for complete search history.

(56) References Cited

U.S. PATENT DOCUMENTS

| | | | | |
|---|---|---|---|---|
| 2005/0024639 | A1* | 2/2005 | Fretel | G01J 1/44 |
| | | | | 356/326 |
| 2010/0253935 | A1* | 10/2010 | MacKinnon | G01J 1/32 |
| | | | | 356/243.1 |
| 2012/0038919 | A1* | 2/2012 | Ikeda | G01J 3/02 |
| | | | | 356/328 |
| 2019/0154503 | A1* | 5/2019 | Yoon | G01J 3/10 |
| 2020/0271518 | A1* | 8/2020 | Liang | G01J 3/0256 |
| 2021/0369119 | A1* | 12/2021 | Peru | A61B 5/14551 |

OTHER PUBLICATIONS

Carlos E. Romero et al., "Spectrometer-based combustion monitoring for flame stoichiometry and temperature control," Applied Thermal Engineering 25, Issues 5-6 (Apr. 2005).

* cited by examiner

SPECTRAL ANALYSIS WITH LINEAR IMAGE SENSOR

TECHNICAL FIELD

The subject matter described herein relates to a spectrometer with a linear array light sensor used with wavelength dependent integration times.

BACKGROUND

Spectral analysis of combustion systems can provide insight into the combustion process occurring in such systems. For example, fuel types, air-fuel ratios, and other properties can be determined from the spectrums of light provided during combustion. Acquiring such a spectrum uses a dedicated system as well. Such a system can include a diffractor and a linear image sensor to determine an intensity of the various light wavelengths produced during combustion.

SUMMARY

This disclosure relates to spectral analysis with a linear image sensor.

An example implementation of the subject matter described within this disclosure is a method with the following features. A first set of data characterizing a spectrum of light emitted or reflected by an object is received from a linear Complementary Metal-Oxide Semiconductor (CMOS) light sensor. Each pixel of the CMOS linear array light sensor corresponds to a specified range of light frequencies. The data includes a first intensity of each pixel at a first sample rate. A subset of pixels is classified as points of interest within the first set of data. A second sample rate of each pixel is determined for each of the subset of pixels. The second sample rate is different from the first sample rate. A second set of data characterizing the spectrum of the light emitted or reflected by an object is retrieved. The second set of data includes a second intensity of each of the subset of pixels at the second sample rate. The first set of data and the second set of data are combined to produce a third set of data characterizing the spectrum. The third set of data characterizing the spectrum is provided.

Aspects of the example method, which can be combined with the example method alone or in combination with other aspects, includes the following. The first set of data is displayed as a spectrum.

Aspects of the example method, which can be combined with the example method alone or in combination with other aspects, includes the following. The third set of data is displayed as a second spectrum.

Aspects of the example method, which can be combined with the example method alone or in combination with other aspects, includes the following. Determining the second sample rate includes comparing an intensity of a spectrum peak to an intensity of the point of interest.

Aspects of the example method, which can be combined with the example method alone or in combination with other aspects, includes the following. The second sample rate is proportional to a difference in magnitude between the spectrum peak and the point of interest.

Aspects of the example method, which can be combined with the example method alone or in combination with other aspects, includes the following. The third set of data has an increased signal-to-noise ratio in comparison to the first set of data.

Aspects of the example method, which can be combined with the example method alone or in combination with other aspects, includes the following. Classifying a subset of pixels as points of interest within the first set of data includes identifying a local minimum or maximum intensity from the first set of data.

An example implementation of the subject matter described within this disclosure is a system with the following features. An optical conditioner is configured to receive light and separate the light into different wavelengths of light. A Complementary Metal-Oxide Semiconductor (CMOS) light sensor is included. Each pixel of the CMOS linear array light sensor corresponds to a specified range of wavelengths. The optical conditioner is arranged to direct the different wavelengths of light across the CMOS light sensor. A controller includes at least one data processor and a non-transitory memory storing instructions, which, when executed by the at least one data processor causes the at least one data processor to perform the following operations. A first set of data characterizing a spectrum of light emitted or reflected by an object is received from a linear Complementary Metal-Oxide Semiconductor (CMOS) light sensor. Each pixel of the CMOS linear array light sensor corresponds to a specified range of light frequencies. The data includes a first intensity of each pixel at a first sample rate. A subset of pixels is classified as points of interest within the first set of data. A second sample rate of each pixel is determined for each of the subset of pixels. The second sample rate is different from the first sample rate. A second set of data characterizing the spectrum of the light emitted or reflected by an object is retrieved. The second set of data includes a second intensity of each of the subset of pixels at the second sample rate. The first set of data and the second set of data are combined to produce a third set of data characterizing the spectrum. The third set of data characterizing the spectrum is provided.

Aspects of the example system, which can be combined with the example system alone or in combination with other aspects, include the following. The optical conditioner includes a lens arranged to receive light from a light source or reflective surface and a diffraction grating arranged to receive light from the lens and separate the light received from the lens into multiple wavelengths.

Aspects of the example system, which can be combined with the example system alone or in combination with other aspects, include the following. The optical conditioner includes a lens arranged to receive light from a light source or reflective surface and a prism arranged to receive light from the lens and separate the light received from the lens into multiple wavelengths.

Aspects of the example system, which can be combined with the example system alone or in combination with other aspects, include the following. A combustion chamber defines a viewing window acting as the light source or reflective surface.

Aspects of the example system, which can be combined with the example system alone or in combination with other aspects, include the following. The combustion chamber is within a gas turbine.

Aspects of the example system, which can be combined with the example system alone or in combination with other aspects, include the following. The controller is further configured to perform an operation including adjusting a combustion parameter of the gas turbine based on the provided third set of data.

Aspects of the example system, which can be combined with the example system alone or in combination with other aspects, include the following. Determining the second sample rate includes comparing a magnitude of a spectrum peak to a magnitude of the point of interest.

Aspects of the example system, which can be combined with the example system alone or in combination with other aspects, include the following. The second sample rate is proportional to a difference in magnitude between the spectrum peak and the point of interest.

Aspects of the example system, which can be combined with the example system alone or in combination with other aspects, include the following. The third set of data has an increased signal-to-noise ratio in comparison to the first set of data.

Aspects of the example system, which can be combined with the example system alone or in combination with other aspects, include the following. Classifying a subset of pixels as points of interest within the first set of data includes identifying a local minimum or maximum intensity from the first set of data.

Aspects of the example system, which can be combined with the example system alone or in combination with other aspects, include the following. The CMOS sensor has a resolution greater than a Nyquist sampling criteria.

An example implementation of the subject matter described within this disclosure is a non-transitory computer readable memory storing instructions which, when executed by at least one data processor forming part of at least one computing system, causes the at least one data processor to perform the following operations. A first set of data characterizing a spectrum of light emitted or reflected by an object is received from a linear light sensor. Each pixel of the linear light sensor corresponding to a specified range of light frequencies. The first set of data includes a first intensity of each pixel at a first sample rate. A subset of pixels is classified as points of interest within the first set of data. A second sample rate of each pixel is determined for each of the subset of pixels. The second sample rate is different from the first sample rate. A second set of data characterizing the spectrum of the light emitted or reflected by an object is retrieved. The second set of data includes a second intensity of each of the subset of pixels at the second sample rate. The first set of data and the second set of data is combined to produce a third set of data characterizing the spectrum. The third set of data characterizing the spectrum is provided.

Aspects of the non-transitory computer readable memory storing instructions, which can be combined with the non-transitory computer readable memory alone or in combination with other aspects, include the following. The third set of data has an increased ratio in comparison to the first set of data.

Aspects of the non-transitory computer readable memory storing instructions, which can be combined with the non-transitory computer readable memory alone or in combination with other aspects, include the following. Classifying a subset of pixels as points of interest within the first set of data includes identifying a local minimum or maximum intensity of the first set of data.

BRIEF DESCRIPTION OF THE FIGURES

These and other features will be more readily understood from the following detailed description taken in conjunction with the accompanying drawings.

DETAILED DESCRIPTION

Figure 1:
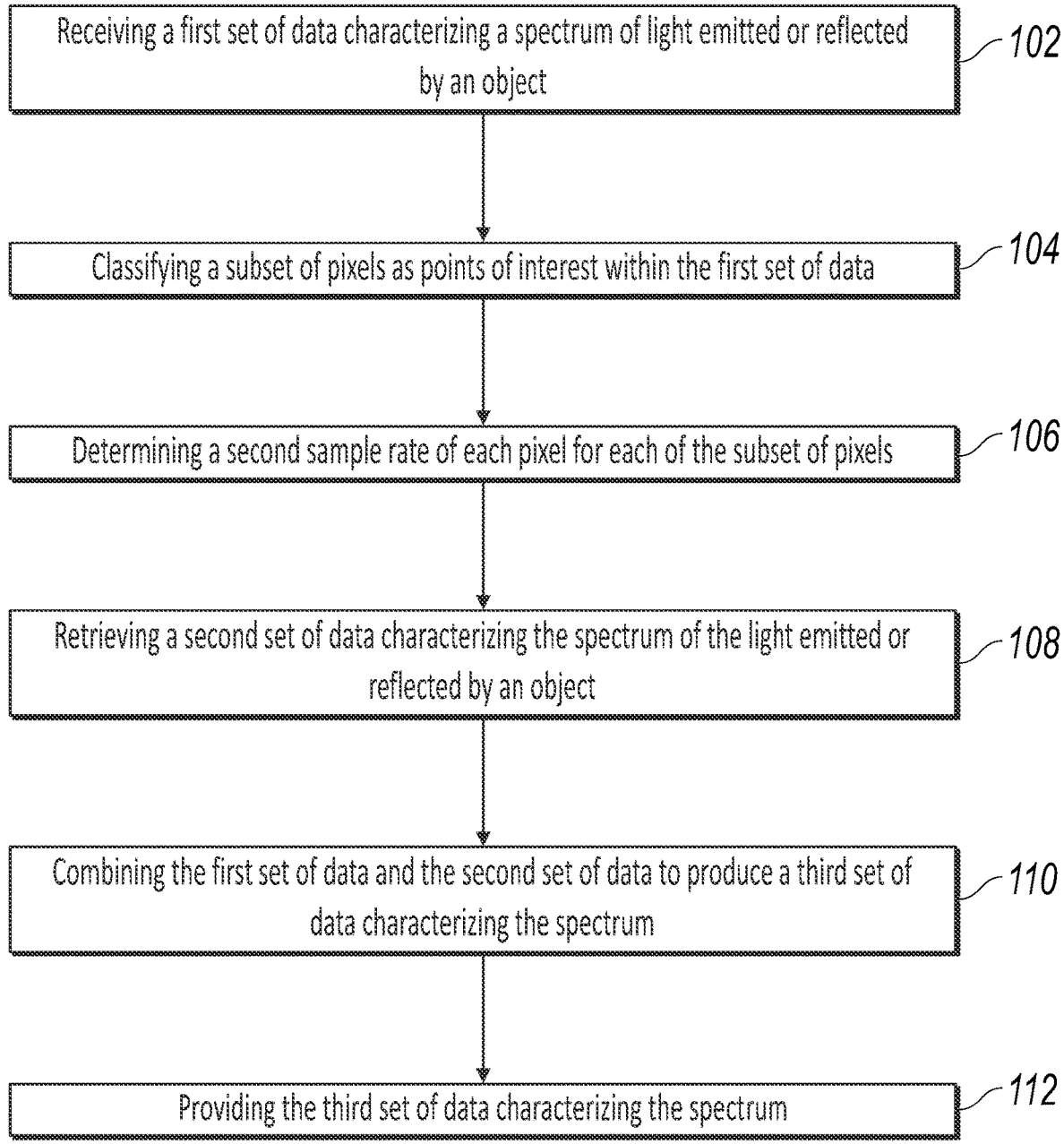
FIG. 1 is a flowchart of an example method that can be used with aspects of this disclosure.

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Complementary Metal-Oxide Semiconductor (CMOS) light sensors include multiple light sensitive pixels. When light is received by an individual pixel, a charge builds on the individual pixel. The rate of charge build is proportional to an intensity of the light received by the pixel. At a specified interval, the charge is measured by pulling charge off of the pixel, discharging the pixel in the process. Thus, the sensor can be thought of as integrating light intensity over a duration of time for each pixel based on a rate that the pixels are discharged, or sampled. Typically, an entire array of pixels on a CMOS light sensor are sampled at a same integration value, or sample rate. This practice can result in considerable noise for pixels that do not receive as much light as other pixels across the same CMOS light sensor as there is a baseline amount of noise in the system, and so pixels that don't receive much light will be measuring a larger proportion of noise (a low signal-to-noise ratio (SNR)), whereas pixels that do receive a fair amount of light will be measuring a larger proportion of light (this is a high SNR).

Accordingly, some implementations of the current subject matter include using different sample rates, cadence, or integration times simultaneously across multiple pixels of a single CMOS sensor. For example, a higher sample rate can be used for pixels receiving a higher intensity of light, and a lower sampling rate can be used for pixels receiving a lower intensity of light. By utilizing different sample integration times and cadences simultaneously for different pixels in a single CMOS sensor, some implementations can provide a signal with improved SNR across a wider range of light intensities. Alternatively or in addition, some implementations can provide a faster cadence for the high intensity pixels at an acceptable signal. Such a cadences can also prevent or reduce saturation of the higher intensity pixels, allowing the sensor to be used on a source with a wide dynamic rate of photon intensity as a function of wavelength.

Figure 2:
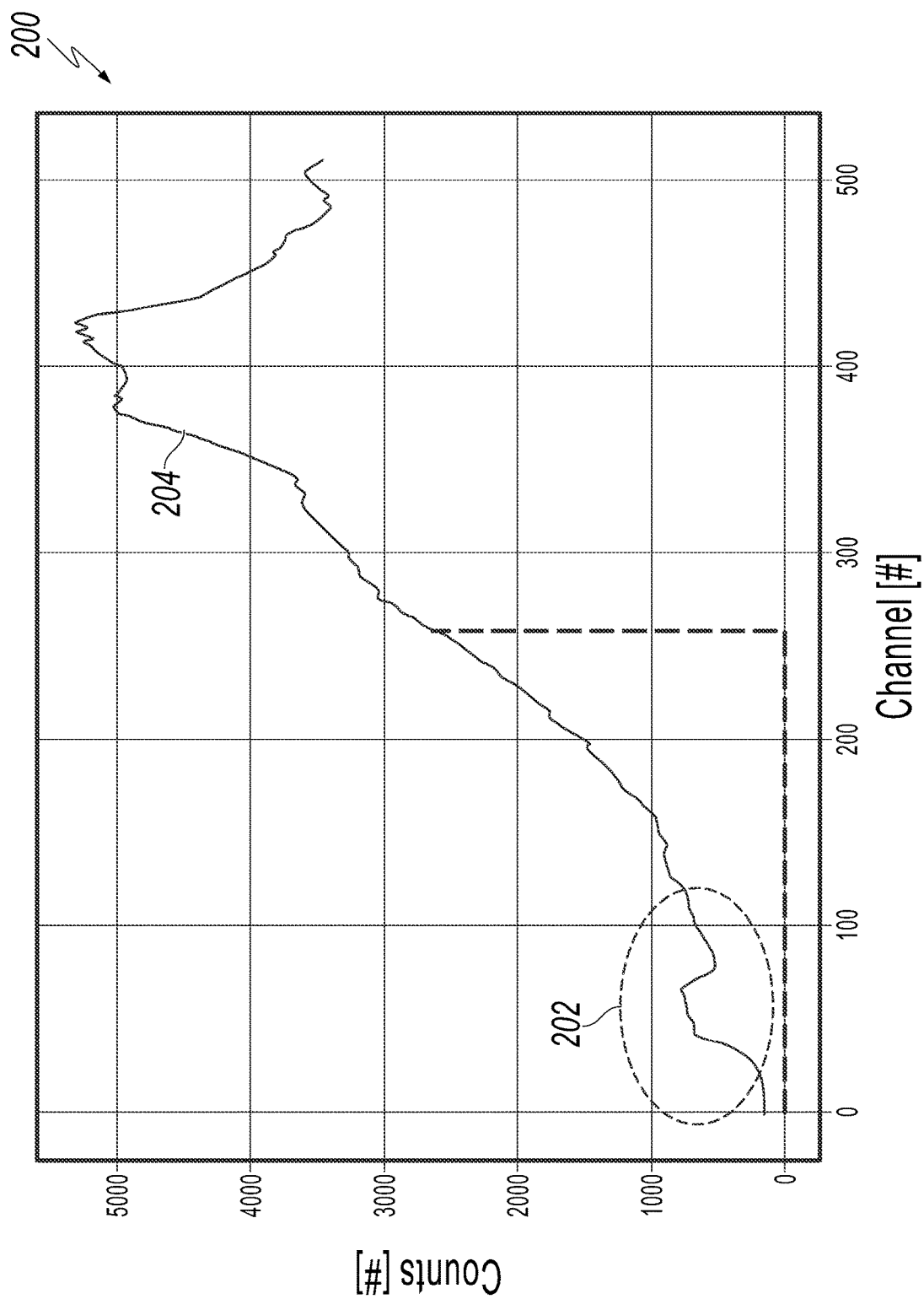
FIG. 2 is an example spectrum that can be used and/or produced with aspects of this disclosure.
Figure 3:
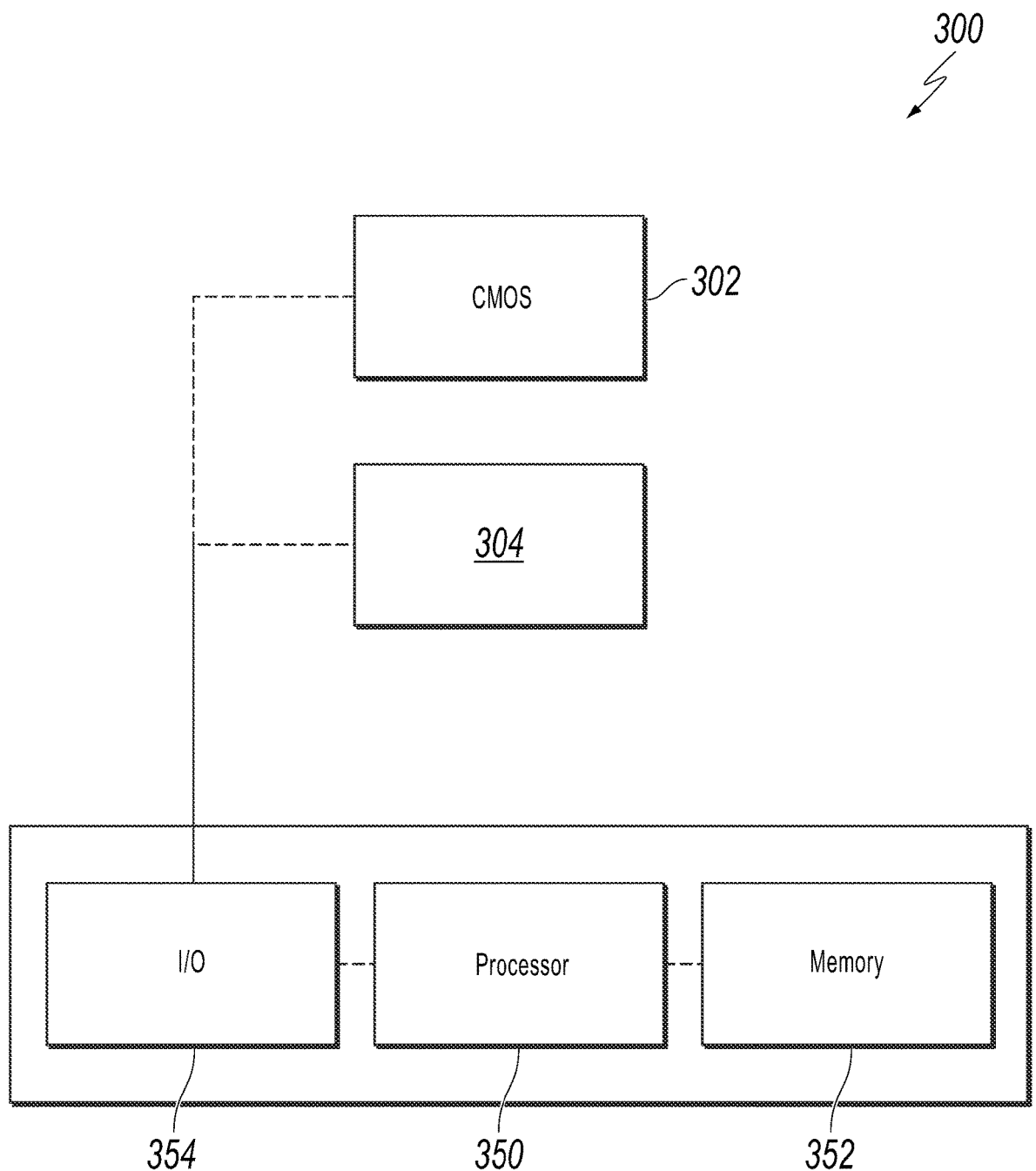
FIG. 3 is a block diagram that can be used with aspects of this disclosure.

Some implementations can include determining the different sample integration values based on different intensities of light received by different pixels. For example, an integration value for a given pixel can be determined to be proportional to a difference in magnitude between a peak intensity on the sensor and a point of interest. In this manner, the integration value can shift between pixels by an amount based on the different intensities of light received by different pixels. This integration and cadence variation can be set on individual pixels or groups of pixels. By determining the different sample integration values based on different intensities of light being received by the different pixels, some implementations can provide a signal with an improved SNR across a wider range of light intensities and an improved cadence for the higher intensity signals. FIG. 1 is a flowchart of an example method 100 that can be used to produce a spectrum taken by a single CMOS sensor with one or more integration values, or sample rates. Such a spectrum can have a ratio SNR greater than if the spectrum were produced with a single integration value or sample rate. While primarily described in relation to a CMOS light sensor, other light sensors, such as photodiode arrays or any higher dimensional pixelated sensor array, can be used without departing from this disclosure. At 102, a first set of data characterizing a spectrum of light emitted or reflected by an object is received from a CMOS linear array light sensor. An example arrangement of the CMOS linear array light sensor receiving a spectrum of light is illustrated in FIG. 3. Each pixel of the CMOS linear array light sensor corresponds to a specified range of light frequencies. The first set of data can include an intensity of each pixel at a first sample rate. Sample rate in the context of this disclosure includes any adjustable rate of exchanging data between the CMOS sensor and a controller, for example, an integration value. An example controller 300, which can perform the method 100 fully or in part, is described later within this disclosure in the context of FIG. 3. In some embodiments, the first set of data can be displayed as a spectrum, as shown in FIG. 2, as a graph 200 illustrating intensity (proximated by counts) over frequency (proximated by CMOS channels, each channel representing a pixel of the CMOS).

Returning to FIG. 1, at 104, a subset of pixels are classified as points of interest 202 within the first set of data. Points of interest can be determined by the controller 300 or an operator. Several factors can be taken into account to determine the subset of pixels to be categorized as points of interest 202, for example, in some embodiments, a local minimum or maximum intensity can be identified from the first set of data and can be determined to be a point of interest 202. Alternatively or in addition, points of interest can include non-adjacent pixels.

Regardless of how points of interest are determined, at 106, a second sample rate is determined for each pixel for each of the subset of pixels. That is, a second sample rate, which can be different from the first sample rate, is determined for the subset of pixels. A variety of different criteria can be used to determine the second sample rate, for example, in some instances, an intensity of a spectrum peak is compared to an intensity of the point of interest, and the second sample rate can be proportional to a difference in magnitude between the spectrum peak and the point of interest. For example, in FIG. 2 the spectrum peak 204 has an intensity approximately five times that of the point of interest 202, then the second sample rate may be one fifth the first sample rate. Regardless of the criteria used to determine the first or the second sample rate, the sample rate or the pixel resolution can be greater than a Nyquist sampling criteria. For example, in some implementations, half of the pixels can be sampled at the faster sample rate. Alternatively or in addition, different sections of flames flicker at different rates and have different spectrum characteristics. Sample rates can be adjusted accordingly to ensure accurate data capture.

Returning to FIG. 1, at 108, a second set of data characterizing the spectrum of the light emitted or reflected by an object is retrieved. The second set of data includes a second intensity of each of the subset of pixels at the second sample rate. In some embodiments, each pixel not in the subset of pixels is also re-sampled at the original sample rate.

Regardless, at 110, the first set of data characterizing the pixels outside of the subset of pixels and the second set of data characterizing the subset of pixels is combined to produce a third set of data characterizing the spectrum. Combining the first set of data and the second data can include overlaying the first set of data and the second set of data. In some embodiments, combining the first set of data and the second set of data can include removing data characterizing the subset of pixels from the first set of data and replacing the data characterizing the subset of pixels with the second set of data. Alternatively or in addition, in embodiments where each pixel not in the subset of pixels is also re-sampled at the original sample rate, the first set of data and the second set of data need not be combined, and the second set of data can be used on its own in lieu of the third set of data.

At 112, the third set of data characterizing the spectrum is provided. In some instances, the third set of data has an increased ratio SNR in comparison with the first set of data. In some embodiments, the third set of data can be displayed as a second spectrum. In some embodiments, the third set of data can be used to determine functional characteristics of a system and control the system in response. Examples of such embodiments are described throughout this disclosure.

FIG. 3 illustrates an example controller 300 that can be used with some aspects of the current subject matter. For example, in some embodiments, the controller can execute all or part of the method 100. The controller 300 can, among other things, monitor parameters of a system, send signals to actuate and/or adjust various operating parameters of such systems. Examples of such a system are described later within this disclosure. As shown in FIG. 3, the controller 300 can include one or more processors 350 and non-transitory computer readable memory storage (e.g., memory 352) containing instructions that cause the processors 350 to perform operations. The processors 350 are coupled to an input/output (I/O) interface 354 for sending and receiving communications with components in the system, including, for example, a linear CMOS sensor 302. In certain instances, the controller 300 can additionally communicate status with and send actuation and/or control signals to one or more of the various system components (including, for example, a fuel flow pump) of the system, as well as other sensors (e.g., pressure sensors, temperature sensors, vibration sensors and other types of sensors) that provide signals to the system.

The controller 300 can be implemented with various levels of autonomy. In some embodiments, the controller 300 provides an initial spectrum to an operator, and the operator then selects points of interest prior to the controller receiving the second set of data or the third set of data. In some embodiments, the controller 300 provides recommendations to the operator as to which pixels should be deemed as areas of interest. The operator then agrees with the recommendation or makes their own selection prior to the controller receiving the second set of data or the third set of data. In some instances, the controller 300 determines which pixels shall be deemed as areas of interest, and proceeds to select points of interest prior to the controller receiving the second set of data or the third set of data with no input from the operator.

Figure 4:
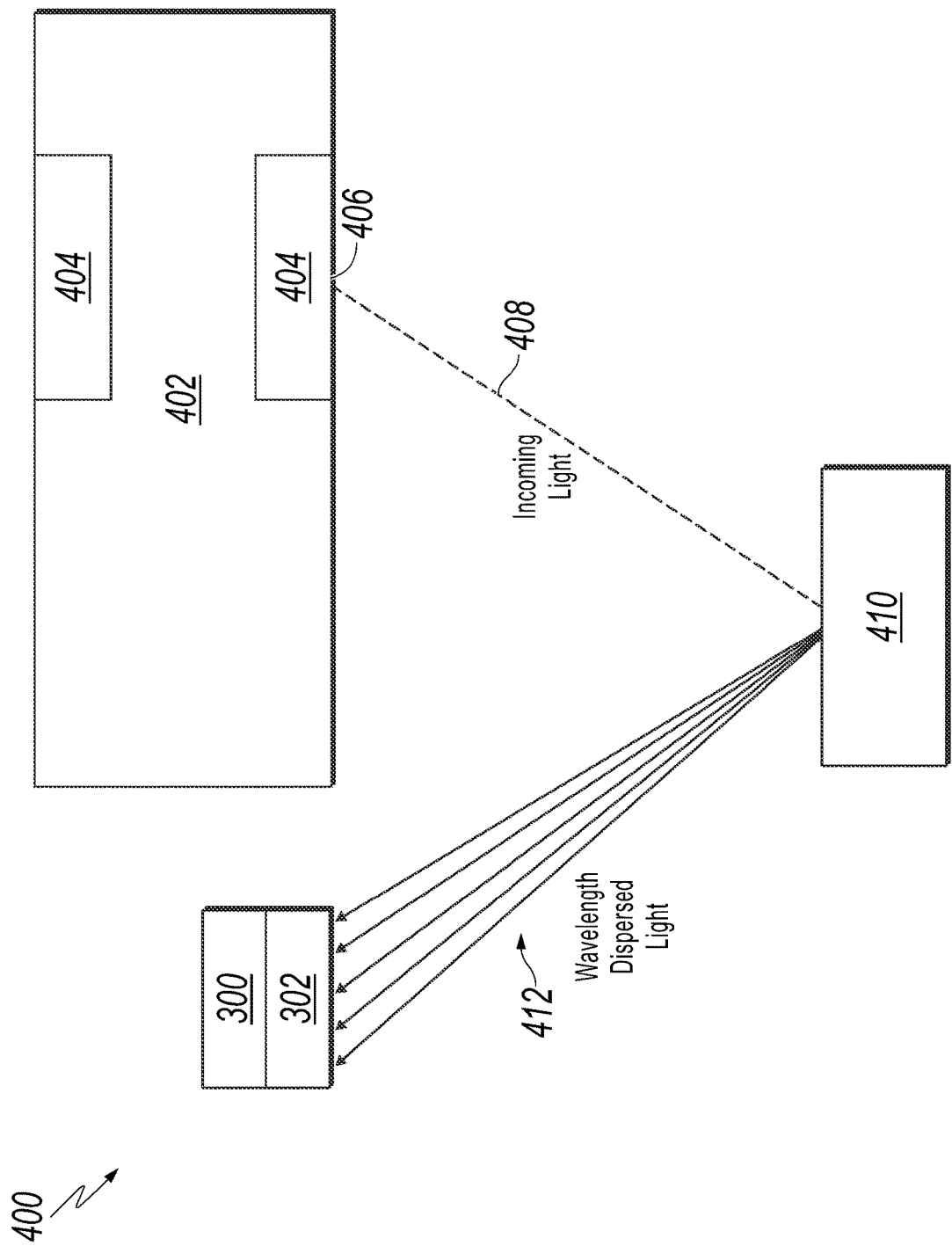
FIG. 4 is a block diagram of an example system in which the example method can be used.
Figure 5A:
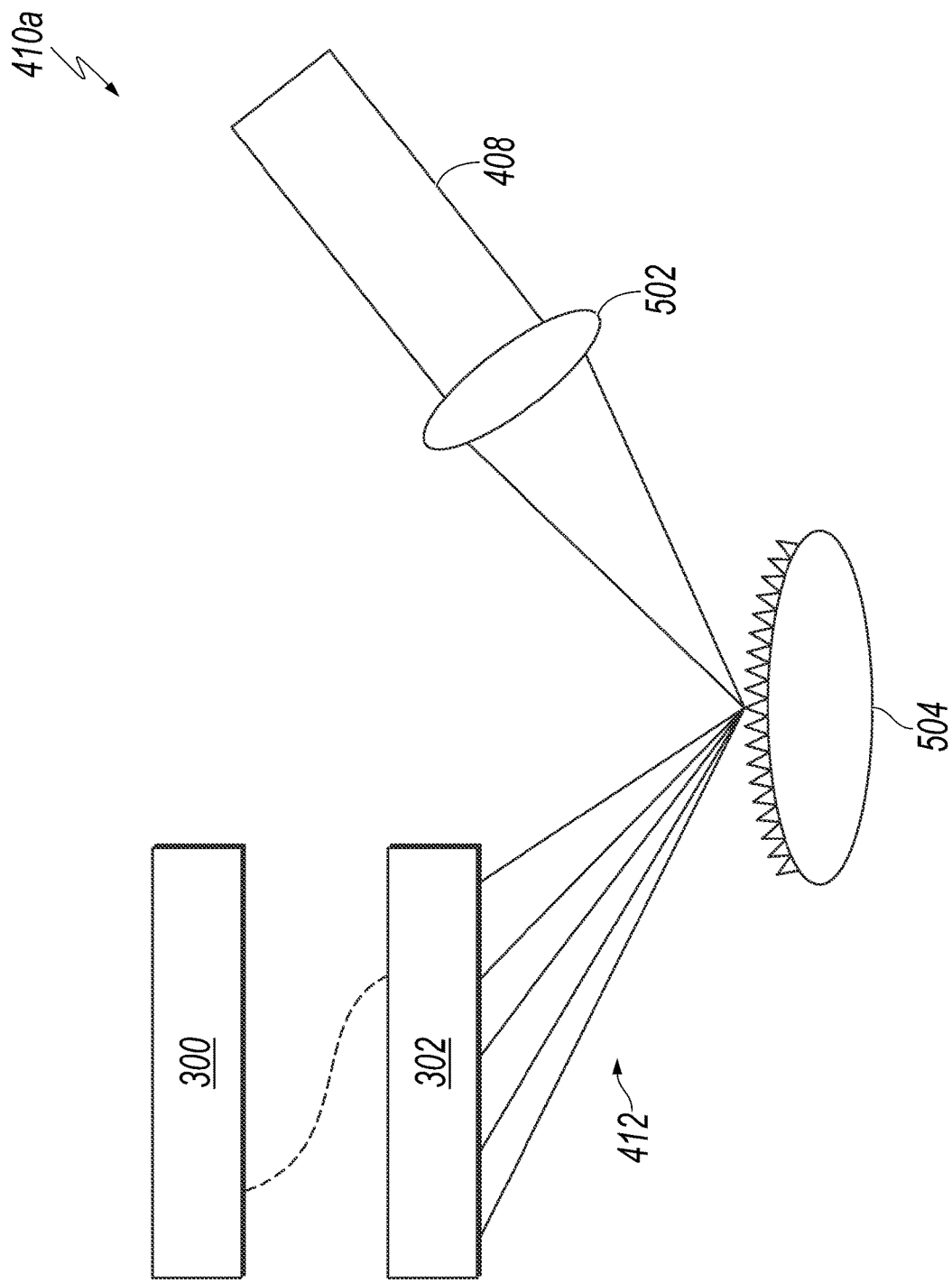
FIG. 5A is a schematic diagram of an example light conditioning system that can be used with aspects of this disclosure.
Figure 5B:
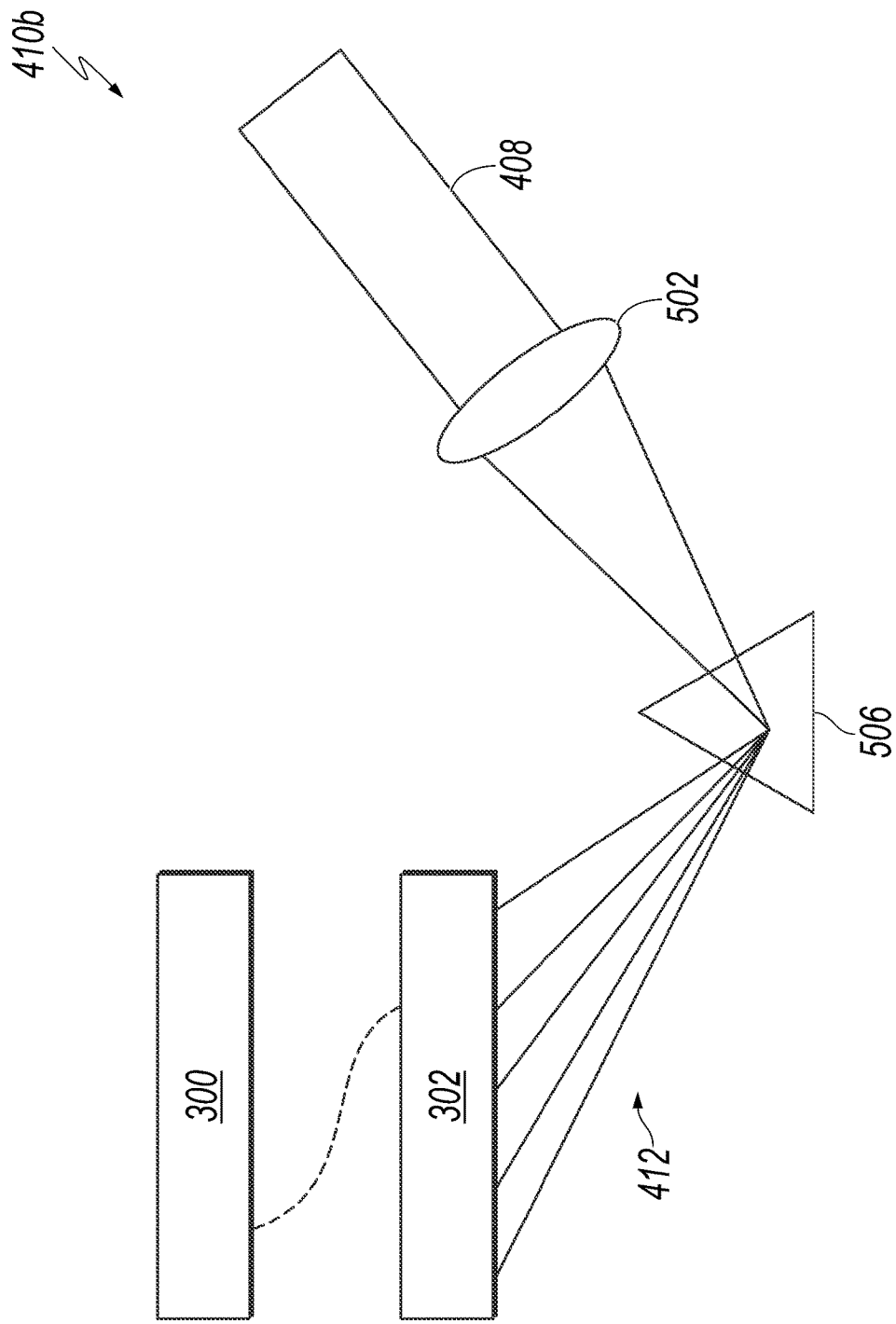
FIG. 5B is a schematic diagram of an example light conditioning system that can be used with aspects of this disclosure.

Other aspects of the method 100 can similarly be performed by the controller with various degrees of autonomy, for example, determining the first sample rate or the second sample rate. In embodiments where the controller is coupled to an actuable device 304, the controller can also have similar degrees of autonomy to send signals controlling the actuable device 304 in response to the provided spectrum. Examples of such embodiments are described throughout FIG. 4 is a schematic diagram of an example spectrum analyzing system 400 that includes the controller 300 and linear CMOS sensor 302 previously described. In the illustrated example, a gas turbine 402 includes a combustion chamber 404 defining a view window 406. This window acts as a light source that can be analyzed. While primarily described and illustrated as determining spectrum characteristics during combustion, the subject matter described herein can be used in other applications, for example, in determining spectrum characteristics of fluorescing substances. Referring back to FIG. 4, light 408 from the combustion chamber 404 enters an optical conditioner 410. The optical conditioner receives the light 408 from the window 406 and diffracts the light into multiple wavelengths 412 that are directed to the linear CMOS sensor. The optical conditioner 410 conditions the light prior to analyses and can include a variety of components used to direct and/or focus light prior to being diffracted and directed to the linear CMOS sensor 302. For example, in some embodiments, as shown in FIG. 5A, the optical conditioner 410a (which can be used in place of optical conditioner 410) can include a lens 502 arranged to received light 408 from the combustion chamber 404. A diffraction grating 504 can then be arranged to receive light from the lens 502 and separate the light received from the lens into multiple wavelengths 412. Alternatively or in addition, as shown in FIG. 5B, the optical conditioner 410b (which can be used in place of optical conditioner 410), a prism 506 can be arranged to receive light from the lens 502 and separate the light received from the lens into multiple wavelengths 412. Other components can be included in the optical conditioner without departing from this disclosure. For example, fiber optic cable can be included anywhere between the window and the linear CMOS sensor 302, for example, to position the system away from the gas turbine. Other optical components, such as beam splitters, slits, and polarizers, can be used without departing from this disclosure. Regardless of the components used, the linear CMOS sensor 302 is arranged to receive the diffracted light (multiple wavelengths 412) across the sensing surface of the linear CMOS sensor 302 such that each pixel of the linear CMOS sensor 302 corresponds to a specified range of wavelengths.

The linear CMOS sensor 302 is coupled to the controller 300 as previously described. In some embodiments, the controller is further configured to adjust a combustion parameter of the gas turbine 402 based on the conditioned and received light spectrum. For example, an air-fuel ratio can be adjusted and/or maintained in response to analyzing the received spectrum. While primarily described as analyzing a light spectrum from a gas turbine combustion chamber 404, the teachings described within this disclosure are similarly applicable to other combustion systems, for example, incinerators, boilers, and piston combustion engines.

In some embodiments, source code can be human-readable code that can be written in program languages such as python, C++, etc. In some embodiments, computer-executable codes can be machine-readable codes that can be generated by compiling one or more source codes. Computer-executable codes can be executed by operating systems (e.g., linux, windows, mac, etc.) of a computing device or distributed computing system. For example, computer-executable codes can include data needed to create runtime environment (e.g., binary machine code) that can be executed on the processors of the computing system or the distributed computing system.

Other embodiments are within the scope and spirit of the disclosed subject matter. For example, the method of generating consolidate dataset described in this application can be used in facilities that have complex machines with multiple operational parameters. Usage of the word "optimize"/"optimizing" in this application can imply "improve"/"improving."

Certain embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an embodiment of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving a first set of data characterizing a spectrum of light emitted or reflected by an object, from a single Complementary Metal-Oxide Semiconductor (CMOS) linear array light sensor, each pixel of the CMOS linear array light sensor corresponding to a different specified range of light frequencies, the first set of data comprising a first intensity of each pixel at a first sample rate;
   classifying a subset of pixels as points of interest within the first set of data;
   determining a second sample rate of each pixel for each of the subset of pixels, the second sample rate being different from the first sample rate;
   retrieving a second set of data characterizing the spectrum of the light emitted or reflected by an object, the second set of data comprising a second intensity of each of the subset of pixels at the second sample rate;
   combining the first set of data and the second set of data to produce a third set of data characterizing the spectrum; and
   providing the third set of data characterizing the spectrum.

2. The method of claim 1, further comprising:
   displaying the first set of data as a spectrum.

3. The method of claim 1, further comprising:
   displaying the third set of data as a second spectrum.

4. The method of claim 1, wherein determining the second sample rate comprises comparing an intensity of a spectrum peak to an intensity of a point of interest.

5. The method of claim 4, wherein the second sample rate is proportional to a difference in magnitude between the spectrum peak and the point of interest.

6. The method of claim 1, wherein the third set of data has an increased signal-to-noise ratio in comparison to the first set of data.

7. The method of claim 1, wherein classifying a subset of pixels as points of interest within the first set of data comprises identifying a local minimum or maximum intensity from the first set of data.

8. A system comprising:
an optical conditioner configured to receive light and separate the light into different wavelengths of light;
a single linear Complementary Metal-Oxide Semiconductor (CMOS) light sensor, each pixel of the linear CMOS array light sensor corresponding to a different specified range of wavelengths, the optical conditioner arranged to direct the different wavelengths of light across the CMOS light sensor; and
a controller comprising:
at least one data processor; and
non-transitory memory storing instructions, which, when executed by the at least one data processor causes the at least one data processor to perform operations comprising:
receiving a first set of data characterizing a spectrum of light emitted or reflected by an object, from a linear CMOS array light sensor, each pixel of the CMOS array light sensor corresponding to a specified range of light frequencies, the first set of data comprising a first intensity of each pixel at a first sample rate;
classifying a subset of pixels as points of interest within the first set of data;
determining a second sample rate of each pixel for each of the subset of pixels, the second sample rate being different from the first sample rate;
retrieving a second set of data characterizing the spectrum of the light emitted or reflected by an object, the second set of data comprising a second intensity of each of the subset of pixels at the second sample rate;
combining the first set of data and the second set of data to produce a third set of data characterizing the spectrum; and
providing the third set of data characterizing the spectrum.

9. The system of claim 8, wherein the optical conditioner comprises:
a lens arranged to receive light from a light source or reflective surface; and
a diffraction grating arranged to receive light from the lens and separate the light received from the lens into multiple wavelengths.

10. The system of claim 8, wherein the optical conditioner comprises:
a lens arranged to receive light from a light source or reflective surface; and
a prism arranged to receive light from the lens and separate the light received from the lens into multiple wavelengths.

11. The system of claim 8, further comprising:
a combustion chamber defining a viewing window acting as the light source or reflective surface.

12. The system of claim 11, wherein the combustion chamber is within a gas turbine.

13. The system of claim 12, wherein the controller is further configured to perform an operation comprising adjusting a combustion parameter of the gas turbine based on the provided third set of data.

14. The system of claim 8, wherein determining the second sample rate comprises comparing a magnitude of a spectrum peak to a magnitude of a point of interest.

15. The system of claim 14, wherein the second sample rate is proportional to a difference in magnitude between the spectrum peak and the point of interest.

16. The system of claim 8, wherein the third set of data has an increased signal-to-noise ratio in comparison to the first set of data.

17. The system of claim 8, wherein classifying a subset of pixels as points of interest within the first set of data comprises identifying a local minimum or maximum intensity from the first set of data.

18. The system of claim 8, wherein the CMOS sensor has a resolution greater than a Nyquist sampling criteria.

19. A non-transitory computer readable memory storing instructions which, when executed by at least one data processor forming part of at least one computing system, causes the at least one data processor to perform operations comprising:
receiving a first set of data characterizing a spectrum of light emitted or reflected by an object, from a single linearly arrayed light sensor, each pixel of the linearly arrayed light sensor corresponding to a different specified range of light frequencies, the first set of data comprising a first intensity of each pixel at a first sample rate;
classifying a subset of pixels as points of interest within the first set of data;
determining a second sample rate of each pixel for each of the subset of pixels, the second sample rate being different from the first sample rate;
retrieving a second set of data characterizing the spectrum of the light emitted or reflected by an object, the second set of data comprising a second intensity of each of the subset of pixels at the second sample rate;
combining the first set of data and the second set of data to produce a third set of data characterizing the spectrum; and
providing the third set of data characterizing the spectrum.

20. The non-transitory computer readable memory of claim 19, wherein the third set of data has an increased signal-to-noise ratio in comparison to the first set of data.

21. The non-transitory computer readable memory of claim 19, wherein classifying a subset of pixels as points of interest within the first set of data comprises identifying a local minimum or maximum intensity from the first set of data.

* * * * *